(12) United States Patent
Hake et al.

(10) Patent No.: US 8,714,276 B2
(45) Date of Patent: May 6, 2014

(54) SOIL CHOPPING AND LEVELING SYSTEM (75) Inventors: Rodney D. Hake, Tipton, KS (US);
Michael J. Ohnsat, Tipton, KS (US);
Hank A. Kummer, Tipton, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 376 days.

(21) Appl. No.: 13/045,838

(22) Filed: Mar. 11, 2011

(65) Prior Publication Data
US 2012/0227991 A1 Sep. 13, 2012

(51) Int. Cl.
*A01B 5/00* (2006.01)

(52) U.S. Cl.
USPC .......................................... 172/176; 172/177

(58) Field of Classification Search
USPC .................................. 172/176, 177
See application file for complete search history.

(56) References Cited

U.S. PATENT DOCUMENTS

| | | | | |
|---|---|---|---|---|
| 22,676 | A | * | 1/1859 | Seaman ........................ 222/191 |
| 510,266 | A | * | 12/1893 | Keizer .......................... 172/556 |
| 732,623 | A | * | 6/1903 | Elison ........................... 172/507 |
| 2,928,484 | A | * | 3/1960 | Blocker ........................ 172/549 |
| 3,176,782 | A | * | 4/1965 | Bezzerides ................... 172/534 |
| 3,687,023 | A | * | 8/1972 | Moser et al. .................... 404/90 |
| 4,090,570 | A | * | 5/1978 | Alexander ..................... 172/116 |
| 4,508,177 | A | * | 4/1985 | Wiser ............................ 172/177 |
| 4,682,658 | A | * | 7/1987 | Erickson ......................... 172/73 |
| 5,020,604 | A | * | 6/1991 | Peck .............................. 172/177 |
| 5,080,178 | A | | 1/1992 | Dietrich et al. |
| 5,474,135 | A | | 12/1995 | Schlagel |
| 5,632,343 | A | | 5/1997 | Gengler |
| 5,915,481 | A | * | 6/1999 | Flenker et al. ................ 172/166 |
| 5,953,895 | A | | 9/1999 | Hobbs |
| 6,068,061 | A | | 5/2000 | Smith et al. |
| 6,276,462 | B1 | * | 8/2001 | Dietrich, Sr. .................. 172/138 |
| 6,494,270 | B1 | | 12/2002 | Lawson |
| 6,554,078 | B1 | | 4/2003 | McDonald |
| 6,761,120 | B2 | | 7/2004 | Kovach et al. |
| 6,763,896 | B1 | | 7/2004 | Hurtis |
| 6,871,709 | B2 | | 3/2005 | Knobloch et al. |
| 7,017,675 | B2 | * | 3/2006 | Ankenman et al. ........... 172/146 |
| 7,065,945 | B2 | | 6/2006 | Hurtis |
| 7,143,836 | B2 | | 12/2006 | Dietrich et al. |
| 7,143,837 | B2 | | 12/2006 | Dietrich et al. |
| 7,156,186 | B2 | | 1/2007 | Knobloch et al. |
| 7,806,197 | B2 | * | 10/2010 | Steinlage et al. ............. 172/176 |
| 8,235,132 | B2 | * | 8/2012 | Condrey ....................... 172/177 |
| 2003/0141086 | A1 | | 7/2003 | Kovach et al. |
| 2003/0141088 | A1 | | 7/2003 | Kovach et al. |
| 2004/0144550 | A1 | | 7/2004 | Hurtis |
| 2007/0089888 | A1 | * | 4/2007 | Condrey ....................... 172/690 |
| 2010/0006309 | A1 | | 1/2010 | Ankenman |

* cited by examiner

*Primary Examiner* — Thomas B Will
*Assistant Examiner* — Joel F. Mitchell
(74) *Attorney, Agent, or Firm* — Hovey Williams LLP (57) ABSTRACT

A tillage implement equipped with a finishing attachment for chopping and leveling soil. The implement includes at least one soil engaging element (e.g., a shank) operable to form a trench with mounds on either side of the trench. The finishing attachment includes at least one soil chopping and leveling assembly that is operable to chop up clods of soil and crop remnants in the mounds and to level off the mounds by pushing the mounds at least partially into the trench.

18 Claims, 7 Drawing Sheets

SOIL CHOPPING AND LEVELING SYSTEM

BACKGROUND

1. Field of the Invention

The present invention relates generally to finishing attachments for tillage implements.

2. Description of the Related Art

Many conventional tillage implements are equipped with chisel shanks, cultivator shanks, or other types of soil engaging elements that are designed to aerate the soil. When passed through the soil, these shanks typically create trenches in the field with mounds of soil on either side of the trenches. The existence of trenches and mounds in an agricultural field can be problematic because, for example, it can contribute to soil erosion and can also make proper planting more difficult due to the unevenness of the field surface. Consequently, it is generally desirable to fill in the trenches and level off the mounds left by conventional tillage implements equipped with shanks or other types of vertical soil engaging elements.

A conventional soil leveling method includes mounting an elongated one-piece rotary reel behind the shanks in an attempt to shave off the top of the mounds formed by the shanks. However, the rotary reel merely compresses the soil, which prevents aeration, and does not adequately fill in the trenches formed by the shanks. Additionally, the rotary reel may become clogged with large clods and chunks of soil, which prevents operation of the rotary reel.

SUMMARY

According to one embodiment of the present invention, there is provided a finishing attachment for a tillage implement. The finishing attachment includes a lateral support bar configured for attachment to a rear of the tillage implement and a plurality of soil leveling assemblies coupled to the lateral support bar. Each of the soil leveling assemblies includes first and second independently rotatable chopper wheels and the axes of rotation of said first and second chopper wheels are skewed relative to one another.

According to another embodiment of the invention, there is provided a tillage implement comprising an elevated frame, a plurality of soil engaging elements coupled to and extending downwardly from the frame, and a plurality of independently rotatable soil leveling chopper wheels coupled to a rear of the frame behind the soil engaging elements. The implement has a total number of the chopper wheels that is greater than the total number of the soil engaging elements located in a rear row of the soil engaging elements.

According to a further embodiment of the present invention, there is provided a tillage implement comprising an elevated frame, a plurality of soil engaging elements coupled to and extending downwardly from the frame; and a plurality of leveling assemblies coupled to a rear of the frame behind the soil engaging elements. Each of the leveling assemblies includes first and second independently rotatable chopper wheels having axes of rotation that are skewed relative to one another.

According to yet another embodiment of the invention, there is provided a field tillage method comprising the steps of (a) passing a rear soil leveling element of a tillage implement through a field to thereby form a trench and mounds of soil on either side of the trench; and (b) using a pair of independently rotatable chopper wheels to substantially fill in the trench with soil from the mounds. During step (b), each of the chopper wheels contacts a respective one of the mounds and pushes soil toward the trench.

BRIEF DESCRIPTION OF THE FIGURES

Embodiments of the present invention are described herein with reference to the following drawing figures, wherein.

DETAILED DESCRIPTION

The present inventive concept is susceptible of embodiment in many forms. While the drawings illustrate, and the specification describes, certain embodiments of the invention, it is to be understood that such disclosure is by way of example only. The principles of the present inventive concept are not limited to the particular disclosed embodiments.

Figure 1:
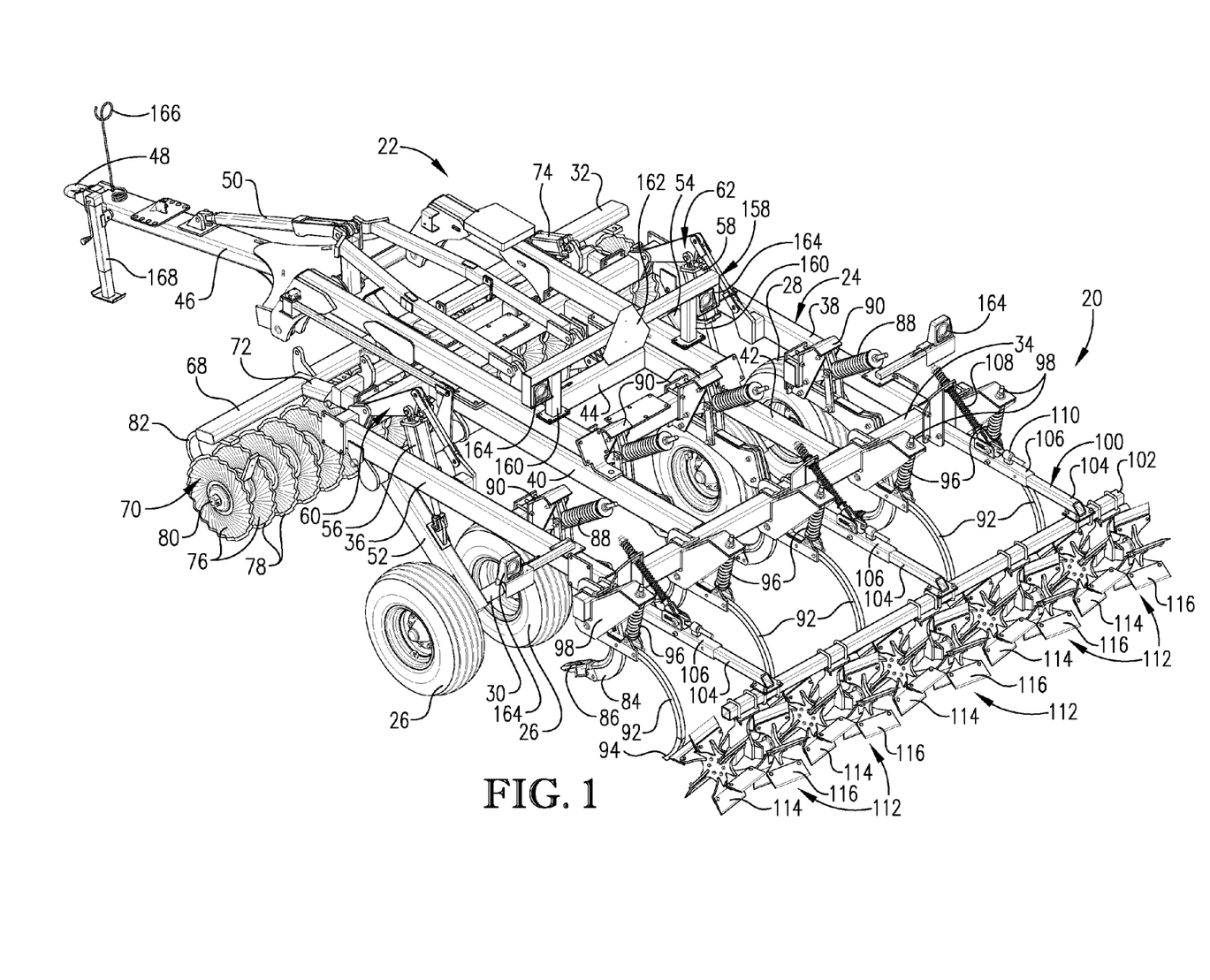
FIG. 1 is a rear left side perspective view of an implement with a soil chopping and leveling system configured in accordance with an exemplary embodiment of the inventive concept.
Figure 2:
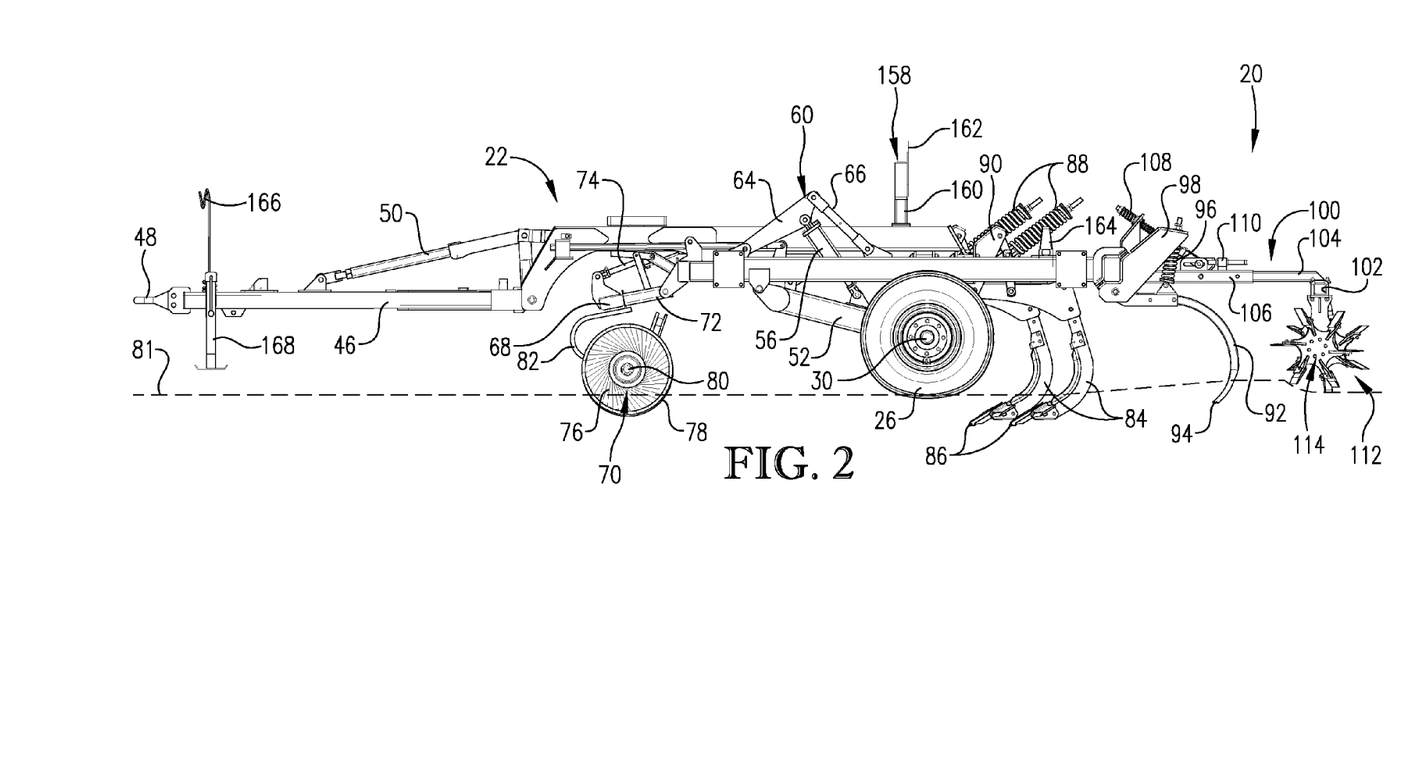
FIG. 2 is a left side elevated view of the implement with the soil chopping and leveling system illustrated in FIG. 1.
Figure 3:
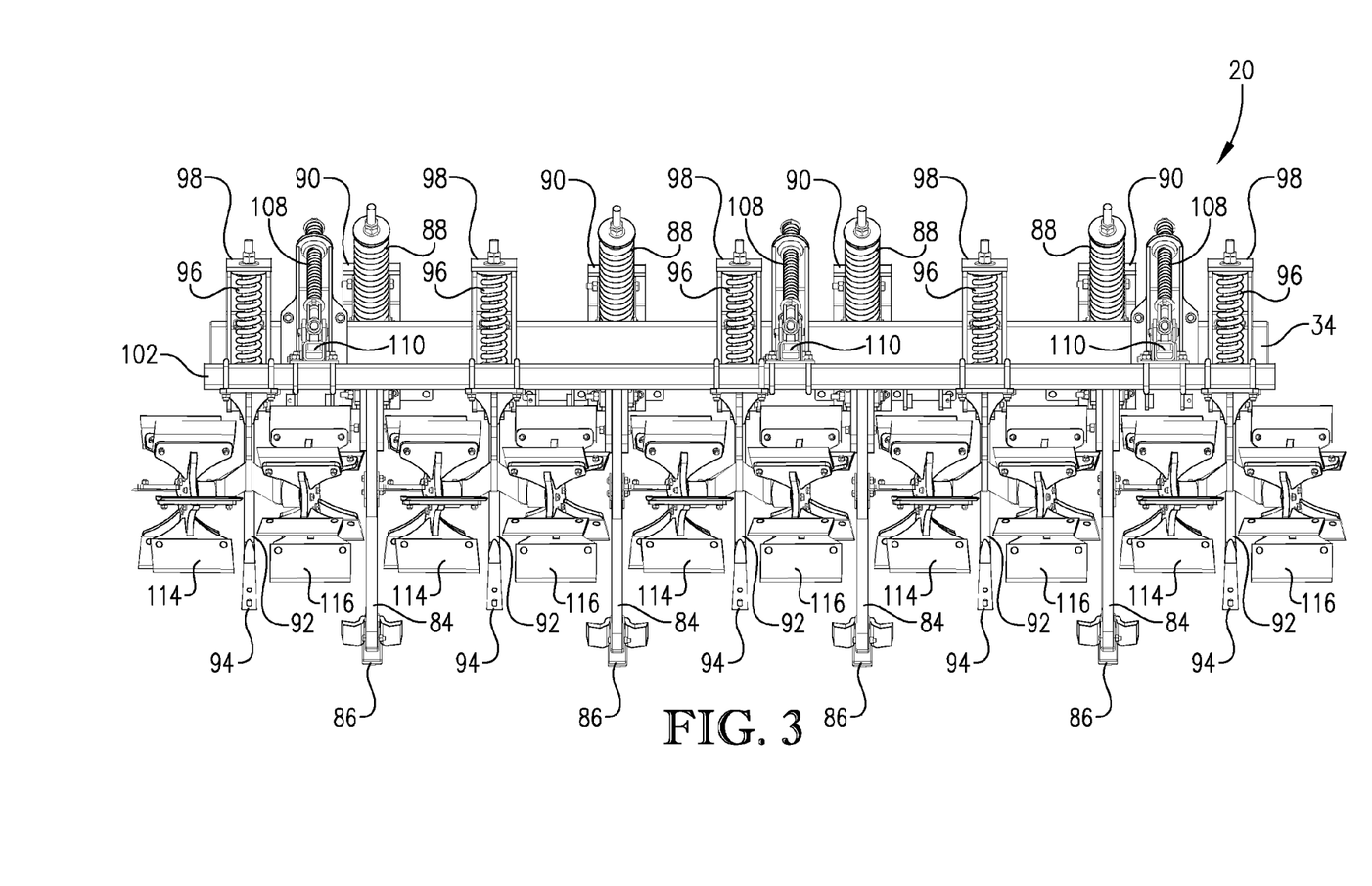
FIG. 3 is a rear elevated view of a plurality of tools on the implement illustrated in FIG. 1.

With initial reference to FIGS. 1-3, a chopping and leveling system 20 is illustrated in an exemplary embodiment with a towable implement 22 that is operable to be hitched to a towing vehicle, e.g., a tractor or the like (not illustrated). The implement 22 has an elongated, rectangular frame assembly 24 that is elevated by a set of left wheels 26 and a set of right wheels 28. Each set of wheels 26, 28 has an axle 30 that joins each set of wheels 26, 28 to each other.

The frame assembly 24 includes front and rear bars 32, 34 that are connected by left and right outer bars, 36, 38, and left and right inner bars 40, 42. The left and right inner bars 40, 42 are spaced from each other by a crossbar 44 that extends parallel to the front and rear bars 32, 34 and is operable to increase the structural integrity of the frame assembly 24.

Extending horizontally from the front bar 32 is a hinged neck 46 with a hitch coupler 48 at an end thereof. In the exemplary embodiment, the hitch coupler 48 is sized and shaped to connect to a standard towing vehicle, such as a tractor. The neck 46 is vertically adjustable and is operable to permit an operator of the implement 22 to raise only the neck 46 rather than the implement 22 in its entirety during a hitching/unhitching operation. Movement of the neck 46 is restricted by a shock 50 that is operable to dampen movement of the neck 46.

The wheels 26, 28 are respectively secured to the outer bars 36, 38 of the frame assembly 24 via hinged legs 52, 54 that depend therefrom. Each of the legs 52, 54 has a hydraulic piston 56, 58 secured thereto that is operable to define a distance between the wheels 26, 28 and the frame assembly 24. Consequently, the operator of the implement 22 may set an elevation of the implement 22 by adjusting one or both of the hydraulic pistons 56, 58. When the elevation of the implement 22 is set to its lowest elevation, the outer bars 36, 38 respectively nest between each set of the wheels 26, 28, as illustrated in FIG. 2.

The hydraulic pistons 56, 58 are operable to raise and lower the frame assembly 24 relative to the ground and respectively connect the legs 52, 54 to the frame assembly 24 via stabilizers 60, 62. Each of the stabilizers 60, 62 include a first hinged portion 64 and a second hinged portion 66. The first hinged portion 64 is secured to the front bar 32 of the frame assembly 24 and the second hinged portion 66, which is secured to one of the outer bars 36, 38 of the frame assembly 24. In this manner, the stabilizers 60, 62 are operable to stabilize the hydraulic pistons 56, 58.

Extending at a downward angle from the front bar 32 of the frame assembly 24 is a vertically-adjustable elongated support member 68 that supports a coulter assembly 70. The support member 68 is connected to the front bar 32 via a plurality of hinged arms 72 that are operable to permit vertical adjustment of the support member 68 and the coulter assembly 70. Vertical adjustment of the support member 68 is controlled by a linear actuator, illustrated as hydraulic cylinder 74, that further connects the support member 68 to the front bar 32 of the frame assembly 24.

The coulter assembly 70 has a plurality of discs 76 with sharpened edges 78 that are arranged along an axle 80. The plurality of discs 76 are operable to penetrate into a field surface or soil 81 while rotating about the axle 80, as illustrated by FIG. 2. The axle 80 is elastically connected to the support member 68 via a spring 82 located adjacent to either end of the support member 68. Each spring 82 is independently operable to provide a degree of movement between the axle 80 and the support member 68, which facilitates operation of the plurality of discs 76, e.g., when traveling over and/or through rough terrain.

Figure 4:
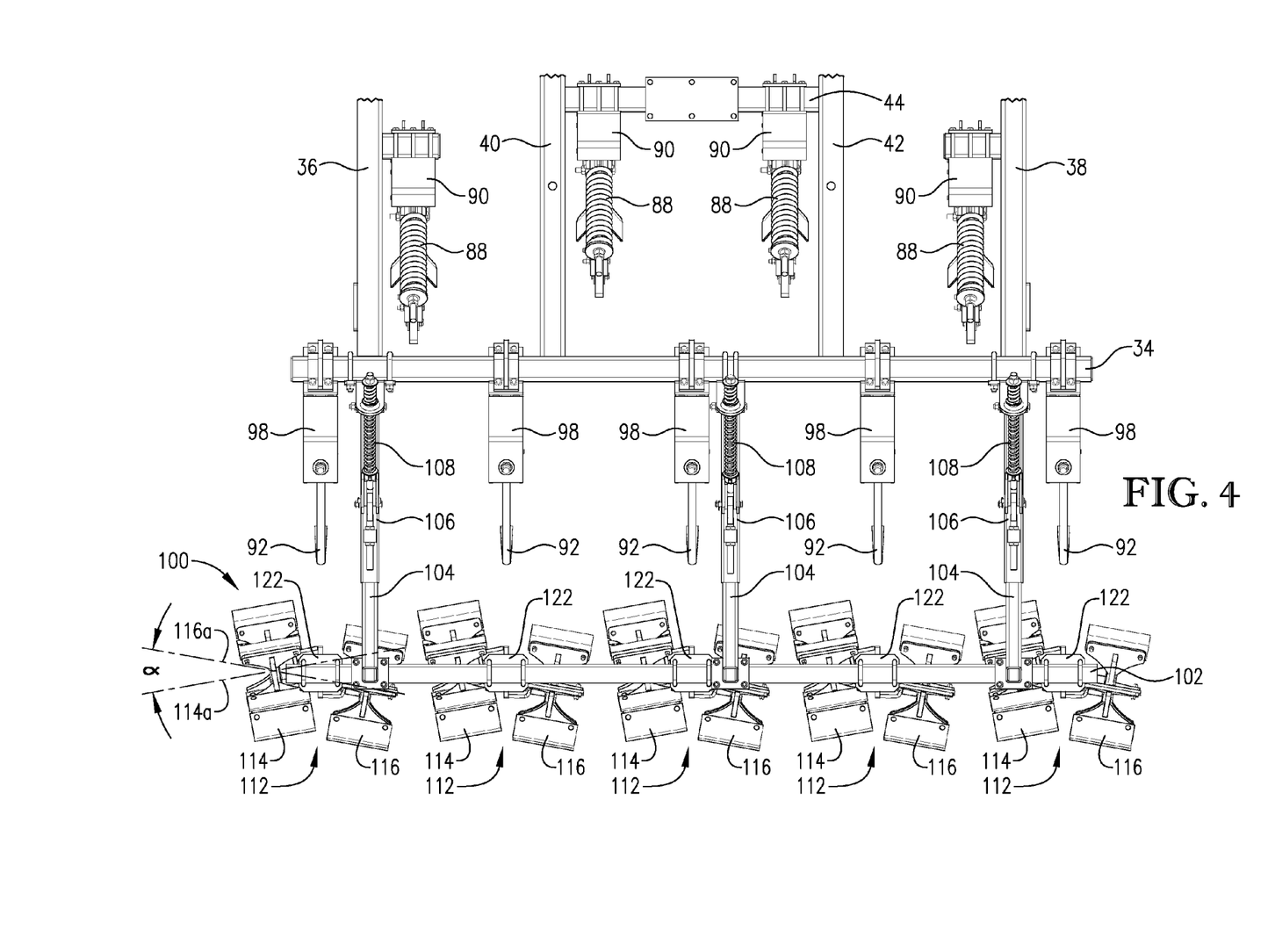
FIG. 4 is a top plan view of a plurality of tools on the implement illustrated in FIG. 1.

Two rows of primary shanks 84 depend from each one of the outer bars 36, 38 and inner bars 40, 42 between the wheels 26, 28 and the rear bar 34, as illustrated in FIGS. 2 and 4. Each primary shank 84 has a point 86 that is operable to facilitate penetration of the primary shank 84 into the soil 81. A spring 88 attached to a support 90 connects each primary shank 84 to the outer bars 36, 38 and inner bars 40 so that each primary shank 84 is independently capable of a degree of movement relative to the frame assembly 24, which facilitates operation of the primary shank 84, e.g., when traveling over and/or through rough terrain.

A rear row of secondary shanks 92 depends from the rear bar 34 of the frame assembly 24, as illustrated in FIGS. 2 and 4. Each secondary shank 92 has a point 94 that is operable to facilitate penetration of the secondary shank 92 into the soil 81. A spring 96 attached to a support 98 connects each secondary shank 92 to the rear bar 34 so that each secondary shank 92 is independently capable of a degree of movement relative to the frame assembly 24, which facilitates operation of the secondary shanks 92, e.g., when traveling over and/or through rough terrain.

Figure 5:
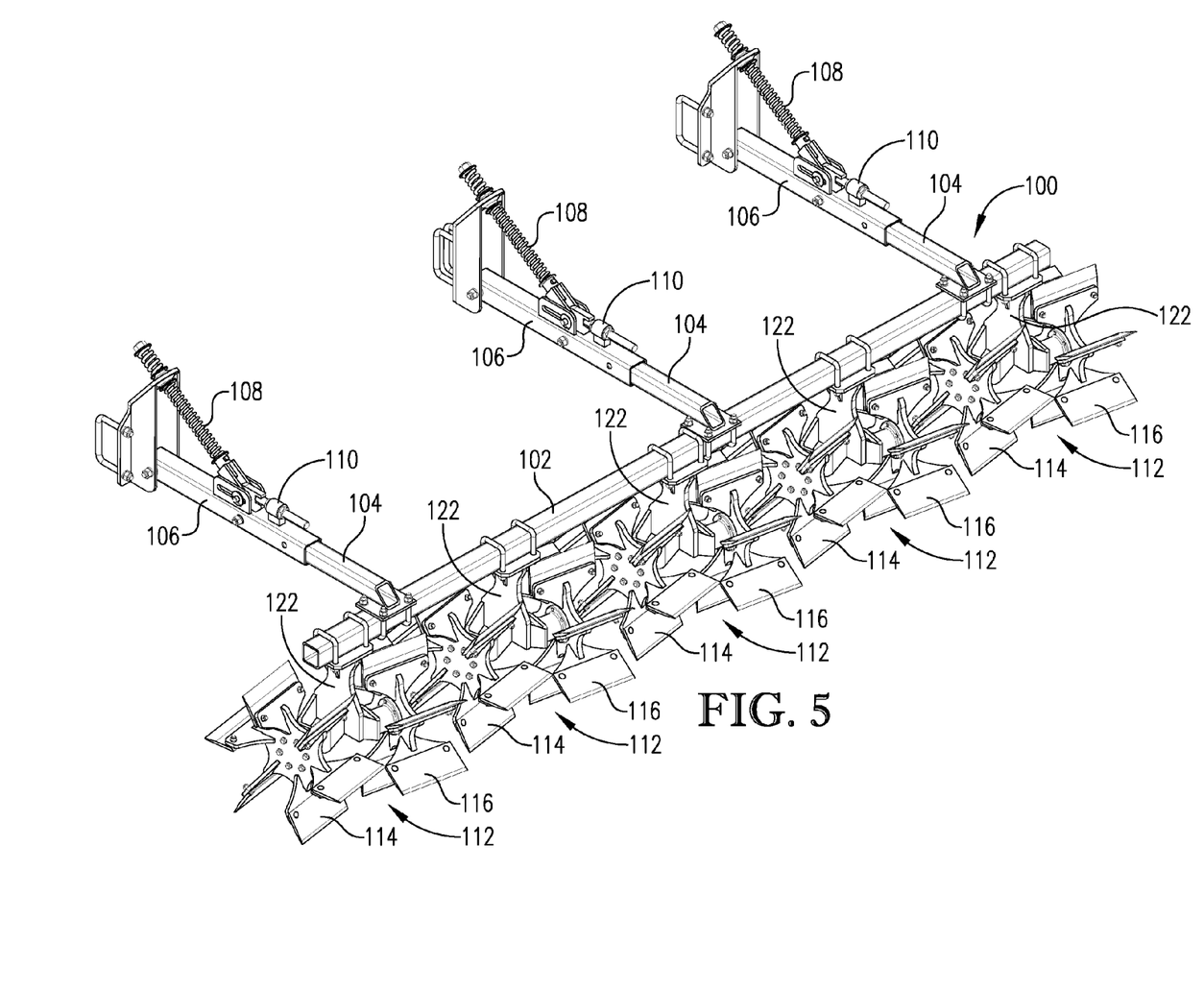
FIG. 5 is a rear left side perspective view of a detachable portion of the implement illustrated in FIG. 1.

The soil chopping and leveling system 20 can take the form of a detachable finishing attachment assembly 100. The finishing attachment assembly 100 extends from a rear of the frame assembly 24 and has a lateral bar 102 that extends parallel to the rear bar 34 of the frame assembly 24, as illustrated in FIGS. 1, 2, and 5. The lateral support bar 102 has a plurality of longitudinally-extending arms 104 that are sized and shaped to be received by and partially secured within hinged receivers 106. The receivers 106 extend longitudinally from the rear bar 34 to meet the arms 104 and are operable to pivot vertically. A spring 108 is attached to each of the receivers 106 so that the lateral support bar 102 is biased downwardly yet capable of a degree of movement relative to the frame assembly 24, which facilitates operation of the implement 22, e.g., when traveling over and/or through rough terrain. Each receiver 106 has a height-adjustment mechanism 110 to permit an operator of the implement 22 to control a height of the lateral support bar 102 with respect to the soil 81, an operation that will be discussed further hereafter.

Figure 8:
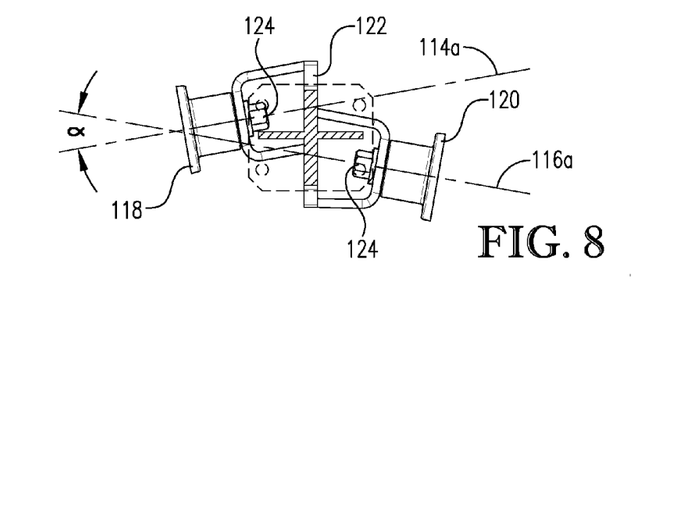
FIG. 8 is a top plan view of a hub of a leveling assembly of the implement illustrated in FIG. 1.

The lateral support bar 102 has a plurality of chopping and leveling assemblies 112 spaced along a length thereof and positioned directly behind each of the secondary shanks 92, as illustrated in FIG. 4. Each chopping and leveling assembly 112 has a first and second rotatable chopper wheel 114, 116 that are operable to rotate independently from each other. As depicted in FIGS. 4 and 8, the chopper wheels rotate on separate axes of rotation 114a, 116a. The axes of rotation 114a, 116a are substantially horizontal, horizontally staggered, and skewed relative to each other by a skew angle ($\alpha$). In the exemplary embodiment, the skew angle ($\alpha$) of the first and second rotatable chopper wheels 114, 116 is in a range of 5 to 40 degrees or in the range of 10 to 30 degrees. It is foreseen, however, that the first and second rotatable chopper wheels 114, 116 may be skewed at any skew angle or not skewed without deviating from the scope of the present inventive concept.

Figure 6:
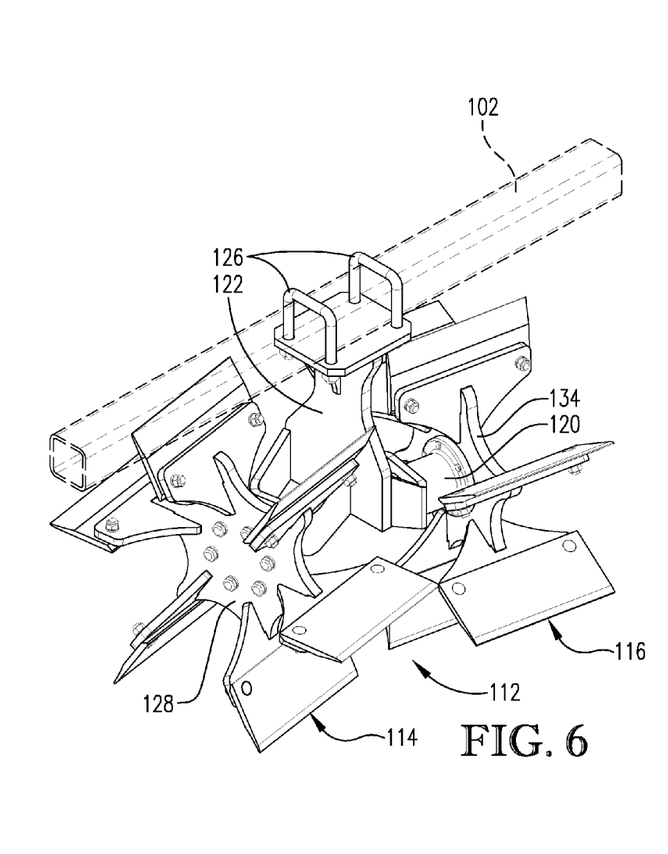
FIG. 6 is a rear left side perspective view of a leveling assembly of the implement illustrated in FIG. 1.
Figure 7:
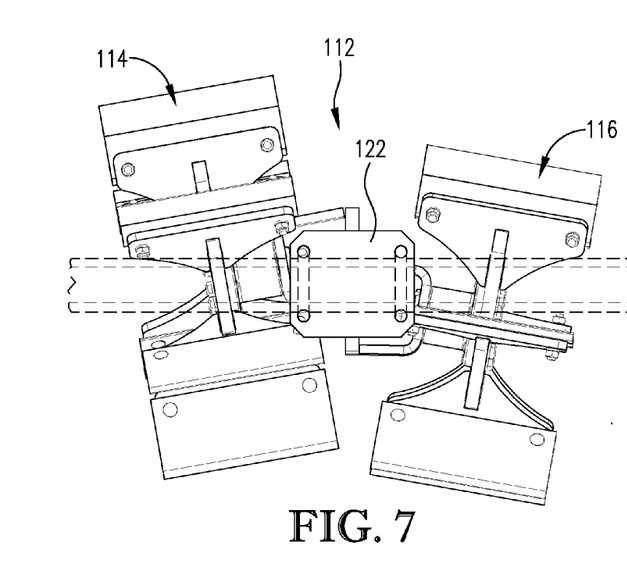
FIG. 7 is a top plan view of a leveling assembly of the implement illustrated in FIG. 1.

The first and second independently rotatable chopper wheels 114, 116 are respectively connected via hubs 118, 120 mounted to either side of a central upright support 122, as shown in FIG. 8. Each hub 118, 120 is affixed to the central upright support 122 via bolts 124, and the central upright support 122 is secured to the lateral bar 102 via a clamp 126, as shown in FIG. 6. The hubs 118, 120 are angled to position the first and second rotatable chopper wheels 114, 116 at the skew angle ($\alpha$), as illustrated in FIG. 8. As perhaps best illustrated in FIGS. 7 and 8, in the exemplary embodiment, the first hub 118 is horizontally offset forward of the second hub 120, which positions the first rotatable chopper wheel 114 forward to the second rotatable chopper wheel 116, thereby horizontally staggering the chopper wheels 114, 116. In this manner, the first rotatable chopper wheel 114 is positioned closer to rear row of secondary shanks 92 than the second rotatable chopper wheel 116. It is foreseen that the hubs 118, 120 may be horizontally offset in a reverse order, in an alternating order, and/or aligned horizontally without deviating from the scope of the present inventive concept.

Figures 9, 10:
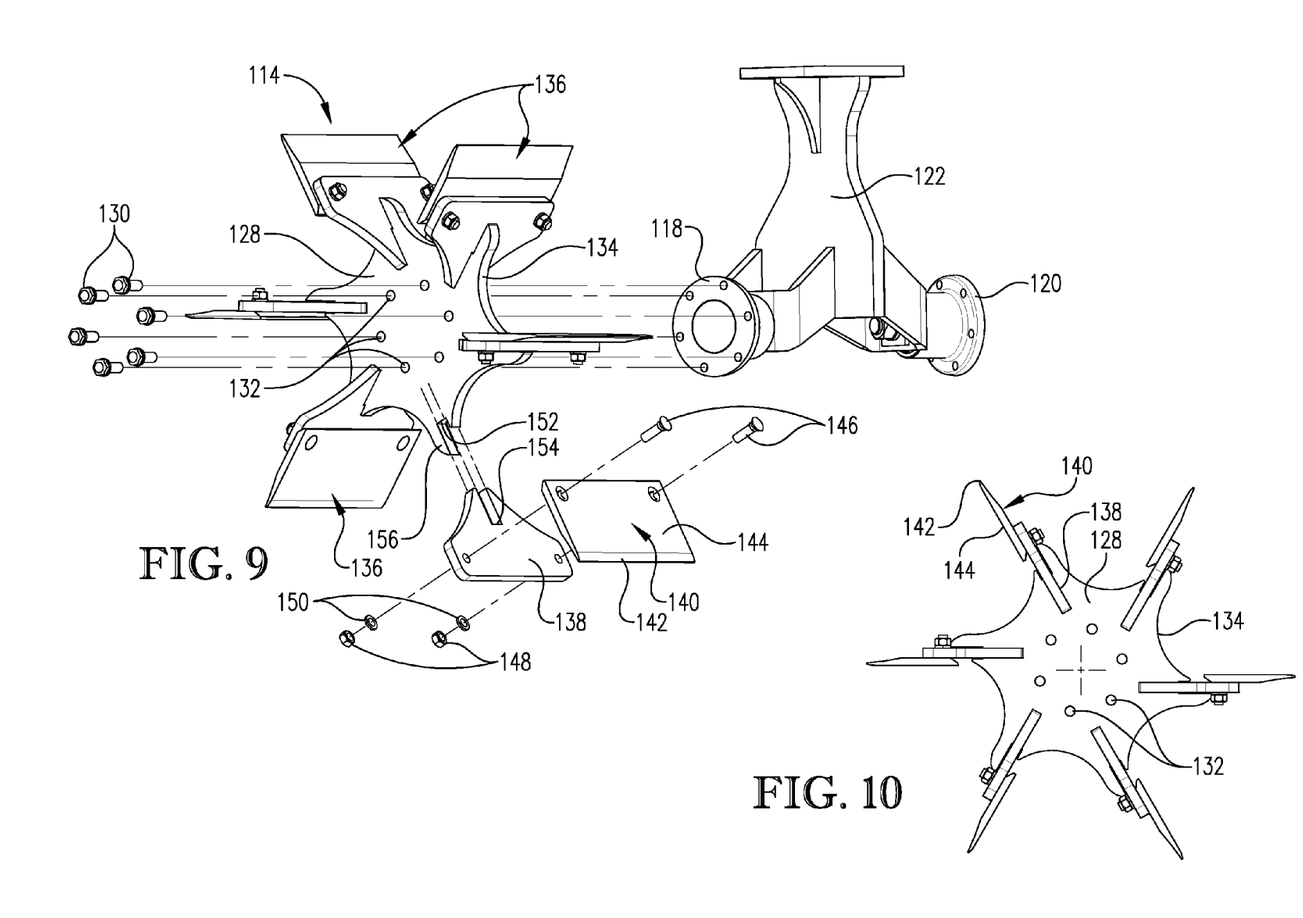
FIG. 9 is a rear left side exploded perspective view of a hub and a chopper wheel of a leveling assembly of the implement illustrated in FIG. 1.
FIG. 10 is a left side elevated view of a chopper wheel of the implement illustrated in FIG. 1.

As illustrated in FIG. 9, the first and second rotatable chopper wheels 114, 116 each include a radial support member 128 that extends radially outward from its respective hub 118, 120. Each radial support member 128 is affixed to its respective hub 118, 120 via bolts 130 that extend through apertures 132 circumferentially located about a center of the radial support member 128. The radial support member 128 has a grooved circumferential edge 134 with an inner-most portion of each groove 134 adjacent to one of the apertures 132, as illustrated in FIGS. 9 and 10.

A plurality of soil-leveling blade assemblies 136 are secured along the grooved circumferential edge 134 of each radial support member 128 at an outer-most portion of each groove 134 and extend radially outward from the axes of rotation of the first and second rotatable chopper wheels 114, 116. Each blade assembly 136 includes a support base 138 and a horizontally extending soil leveling blade 140 that is connected to the support base 138. Each blade 140 has a sharpened horizontal edge 142 and a face surface 144 that faces a direction of rotation of the first and second rotatable chopper wheels 114, 116. The blade 140 is secured to the support base 138 via a set of screws 146 and nuts 148 with washers 150 therebetween, as illustrated in FIG. 9.

Each blade assembly 136 nests within one of a plurality of slots 152 that extend from the grooved circumferential edge 134 toward the center of the radial support member 128 and are sized and shaped to engage a corresponding slot 154 of the blade assembly 136. In this manner, each blade assembly 136 is spaced circumferentially relative to each other and defines a radial plane that is offset relative to a radial plane that passes through a center of the radial support member 128. The slots 152, 154 secure each blade assembly 136 to the radial support member 128 via a friction-fit engagement. Additional support is provided to the blade assembly 136 by a reinforcement region 156 on one side of the slot 152 of the radial support member 128. The reinforcement region 156 extends more radially from the radial support member 128 relative to the other side of the slot 152 and is operable to provide additional support to a side of the blade assembly 136 that is opposite to the face surface 144. It is foreseen that the blade assemblies 136 may be secured to the radial support member 128 via other attachment means instead of the slots 152, 154, e.g., bolting, welding, and the like, without deviating from the scope of the present inventive concept.

The implement 22 is equipped with a plurality of safety and convenience features. Safety features include a safety bar 158 that projects vertically from an approximate center of the implement 22. The safety bar 158 is supported by legs 160 that are connected to inner bars 40, 42, and includes a reflective, triangular caution sign 162. Additionally, a plurality of reflective, illuminable lights 164 are positioned on the safety bar 158 and outer bars 36, 38. Convenience features include a hose and wire guide 166 on the neck 46 to facilitate routing and support of hydraulic hoses and electrical wires (not show) to be connected to the towing vehicle (not shown). The neck 46 additionally includes a telescoping stand 168 to support the neck 46 when the implement 22 is stored and not hitched to a towing vehicle.

In use, the operator of the chopping and leveling system 20 secures the implement 22 to a towing vehicle, e.g., a tractor (not illustrated) by raising the neck 50, which may be accomplished by extending the telescoping stand 168. Once the neck 50 is sufficiently elevated, the hitch coupler 48 may be secured to a hitch (not illustrated) of the towing vehicle.

Prior to moving the implement 22 from storage, the operator ensures that the coulter assembly 70, the primary and secondary shanks 84, 92, and the chopping and leveling assemblies 112 are elevated and not in contact with the ground. The operator may then maneuver the implement 22 to a starting position in a field via pulling the implement 22 with the tractor.

At the starting position, the operator lowers the primary and secondary shanks 84, 92 to a desired penetration depth by lowering the frame assembly 24 via adjustment of the hydraulic pistons 56, 58 of the legs 52, 54. As the frame assembly 24 is lowered, the outer bars 36, 38 are caused to respectively nest between the sets of wheels 26, 28, as illustrated in FIG. 2. The lowering of the frame assembly 24 also causes and the coulter assembly 70 and the chopping and leveling assemblies 112 to be lowered.

It is desirable for the coulter assembly 70 to penetrate into the soil 81. If additional lowering of the coulter assembly 70 is required after lowering of the frame assembly 24, the coulter assembly 70 may be lowered by extending the telescoping arm 74 so that the coulter assembly 70 extends further into the soil 81 to the desired penetration depth.

It is desirable for the chopping and leveling assemblies 112 to be biased against the soil 81 yet capable of rotating while traveling therealong. If adjustment of the chopping and leveling assemblies 112 is required after lowering of the frame assembly 24, the chopping and leveling assemblies 112 may be lowered via adjustment of each height-adjustment mechanism 110 so that the chopping and leveling assemblies 112 are sufficiently pressed against the soil 81 yet capable of rotation.

The operator may then begin to maneuver the chopping and leveling system 20 across the soil 81. As the implement 22 travels over the soil 81, the coulter assembly 70 rotates and slices through the soil 81 to prepare the soil 81 for further conditioning. The primary shanks 84 then penetrate through and churn the soil 81 to a degree that a primary trench is formed with irregular primary mounds on either side thereof. The secondary shanks 92, which are staggered on either side of the primary shanks 84, then penetrate through a center of each of the primary mounds and churn the primary mounds to a lesser degree than the primary shanks 84. Secondary shanks 92 also pulverize any remnants in the primary mounds and cause the primary mounds to be reduced in size. The secondary shanks 92 form a secondary trench of reduced depth relative to the primary trench in the center of the primary mounds with secondary mounds of reduced size relative to the primary mounds on either side of the secondary trench.

Directly behind each of the secondary shanks 92, as illustrated in FIG. 3, are the chopping and leveling assemblies 112 that align the first and second rotatable chopper wheels 114, 116 in a center of each of the secondary mounds. The first and second rotatable chopper wheels 114, 116 pulverize any remnants in the secondary mounds and are skewed relative to each other so that the first and second rotatable chopper wheels 114, 116 push soil 81 away from the secondary mounds and into the primary and secondary trenches. The skew angle of the first and second rotatable chopper wheels 114, 116 forms a "V" shaped void therebetween that is operable to trap and pulverize remnants from the primary and secondary mounds. Additionally, if one of the first and second rotatable chopper wheels 114, 116 becomes clogged with a large clod or chunk of soil, the other one of the first and second rotatable chopper wheels 114, 116 will continue to rotate independently and is capable of dislodging the large clod or chunk of soil from the one of the first and second rotatable chopper wheels 114, 116 due to the skewed configuration of the first and second rotatable chopper wheels 114, 116. In this manner, the chopping and leveling assemblies 112 cause the primary and secondary mounds to be leveled-off and the primary and secondary trenches are filled yielding a generally uniform surface, as illustrated in FIG. 2.

The preferred forms of the invention described above are to be used as illustration only, and should not be used in a limiting sense to interpret the scope of the present inventive concept. Modifications to the exemplary embodiments, set forth above, could be readily made by those skilled in the art without departing from the spirit of the present inventive concept.

The inventors hereby state their intent to rely on the Doctrine of Equivalents to determine and assess the reasonably fair scope of the present inventive concept as it pertains to any apparatus not materially departing from but outside the literal scope of the invention as set forth in the following claims.

What is claimed is:
1. A finishing attachment for a tillage implement, said finishing attachment comprising:

a lateral support bar configured for attachment to a rear of said tillage implement and having a front side and a rear side with respect to the direction of travel of the attachment during use; and a plurality of soil leveling assemblies coupled to said lateral support bar along a length of the bar, wherein each of said soil leveling assemblies includes independently rotatable, first and second chopper wheels, wherein each of said chopper wheels includes a plurality of laterally extending leveling blades spaced circumferentially about an axis of rotation of the wheel, wherein the axes of rotation of said first and second independently rotatable chopper wheels are skewed relative to one another in such a manner that rear portions of said first and second chopper wheels mutually converge rearwardly whereby the soil leveling assemblies level out and chop up mounds of soil otherwise left behind by the implement.

2. The finishing attachment of claim 1, wherein the axes of rotation of said first and second chopper wheels are skewed relative to one another by a skew angle in the range of 5 to 40 degrees.

3. The finishing attachment of claim 1, wherein each of said blades extends substantially horizontally.

4. The finishing attachment of claim 1, wherein each of said chopper wheels comprises a hub and one or more radial support members coupled to and extending radially outward from said hub, wherein each of said blades is coupled to at least one of said radial support members.

5. The finishing attachment of claim 4, wherein each of said blades is coupled to only one of said radial support members.

6. The finishing attachment of claim 1, wherein said first and second chopper wheels are horizontally staggered in a fore-and-aft direction such that one of said first and second chopper wheels is configured to be positioned closer to the rear of said tillage implement than the other of said first and second chopper wheels.

7. The finishing attachment of claim 1, wherein each of said soil leveling assemblies comprises a single central support attached to said lateral support bar, wherein said central support is disposed generally between said first and second chopper wheels, wherein said first and second chopper wheels are supported solely by said single central support.

8. The finishing attachment of claim 1, wherein said leveling assemblies are disposed directly below said bar with a portion of each chopper wheel projecting forwardly beyond said bar and another portion of each chopper wheel projecting rearwardly beyond said bar.

9. A tillage implement for use in working the soil in a field, said implement comprising:

an elevated frame;

a plurality of soil engaging shanks coupled to and extending downwardly from said frame; and a plurality of soil leveling assemblies coupled to a rear of said frame behind said soil engaging shanks for finishing the surface of the field, wherein each of said soil leveling assemblies includes independently rotatable, first and second chopper wheels, wherein each of said chopper wheels includes a plurality of transversely extending soil leveling blades spaced circumferentially about an axis of rotation of the wheel, wherein the axes of rotation of said first and second chopper wheels are skewed relative to one another in such a manner that rear portions of said first and second chopper wheels mutually converge rearwardly, wherein each of said soil leveling assemblies is disposed directly behind and in alignment with a respective one of said shanks in such a manner that said first and second chopper wheels of the soil leveling assembly are disposed on opposite sides of the path of travel of the shank whereby to finish the surface of the field by leveling out and chopping up mounds of soil otherwise left behind by the shanks.

10. The tillage implement of claim 9, wherein said frame includes a transversely extending bar to which said leveling assemblies are coupled, wherein said leveling assemblies are disposed directly below said bar with a portion of each chopper wheel projecting forwardly beyond said bar and another portion of each chopper wheel projecting rearwardly beyond said bar.

11. The tillage implement of claim 9, wherein the axes of rotation of said first and second chopper wheels are substantially horizontal, wherein the axes of rotation of said first and second chopper wheels are skewed relative to one another by a skew angle in the range of 5 to 40 degrees.

12. The tillage implement of claim 9, wherein each of said soil leveling blades extends substantially horizontally.

13. The tillage implement of claim 9, wherein each of said chopper wheels comprises a hub and one or more radial support members coupled to and extending radially outward from said hub, wherein each of said soil leveling blades is coupled to only one of said radial support members.

14. The tillage implement of claim 9, wherein said first and second chopper wheels are horizontally staggered in a fore-and-aft direction such that one of said first and second chopper wheels is positioned closer to said soil engaging shanks than the other of said first and second chopper wheels.

15. A field tillage method comprising:
(a) passing a soil engaging element of a tillage implement through a field to thereby form a trench and mounds of soil on either side of said trench; and
(b) finishing the surface of the field using a pair of independently rotatable chopper wheels on opposite sides of said trench to substantially fill in said trench with chopped soil from said mounds, wherein each of said chopper wheels contacts a respective one of said mounds and pushes said soil toward said trench, wherein each of said chopper wheels includes a plurality of transversely extending leveling blades spaced circumferentially about an axis of rotation of the wheel, wherein the axes of rotation of said chopper wheels are skewed relative to one another in such a manner that rear portions of said chopper wheels mutually converge rearwardly toward said trench whereby to level out and chop up the mounds of soil otherwise left behind by the soil engaging element.

16. The field tillage method of claim 15, wherein said soil engaging element is a shank.

17. The field tillage method of claim 15, wherein each of said blades extends substantially horizontally and is angled toward said trench to facilitate pushing of said soil toward said trench.

18. The field tillage method of claim 15, wherein said tillage implement comprises at least three additional rear soil engaging elements and a pair of additional independently rotatable chopper wheels associated with each of said additional rear soil engaging elements.

* * * * *